United States Patent [19]

Gambale et al.

[11] Patent Number: 4,959,422
[45] Date of Patent: Sep. 25, 1990

[54] POLY EPOXY BRANCHED POLYCARBONATE AND METHOD FOR PREPARATION

[75] Inventors: Ronald J. Gambale, Croton-on-Hudson; Timothy J. Ullman, Voorheesville, both of N.Y.

[73] Assignee: General Electric Company, Schenectady, N.Y.

[21] Appl. No.: 407,978

[22] Filed: Sep. 15, 1989

[51] Int. Cl.$^5$ ............................................. C08G 64/42
[52] U.S. Cl. ..................................... 525/463; 525/462; 525/467
[58] Field of Search ...................... 525/463, 467, 462

[56] References Cited

U.S. PATENT DOCUMENTS 4,782,124  11/1988  Hefner et al. ........................ 525/463
4,853,458  8/1989  Gambale et al. ..................... 528/198

FOREIGN PATENT DOCUMENTS 0317797  5/1989  European Pat. Off. ............ 525/463
5096648  7/1975  Japan .

Primary Examiner—Harold D. Anderson
Attorney, Agent, or Firm—William H. Pittman; James C. Davis, Jr.

[57] ABSTRACT

Branched polycarbonates are prepared by the reaction of at least one polyepoxy compound, preferably triglycidyl isocyanurate, with at least one carboxylic acid-terminated polycarbonate, preferably of the type prepared by employing t-butyl p-hydroxybenzoate as a chainstopper in an interfacial polycarbonate formation reaction followed by thermal elimination of isobutene. The branched polycarbonates have high melt viscosities and high complex viscosity ratios, and are particularly useful in such operations as blow molding.

20 Claims, No Drawings

POLY EPOXY BRANCHED POLYCARBONATE AND METHOD FOR PREPARATION

This invention relates to branched polycarbonates, and more particularly to branched polycarbonates having excellent properties for such forming operations as blow molding.

Polycarbonates are in wide industrial use for the preparation of articles by such forming methods as injection molding. Many of their properties make them attractive candidates for other types of forming operations, including blow molding, profile extrusion and thermoforming. One problem in such operations is the relatively low melt viscosity of the polycarbonates, as a result of which the formed articles do not adequately retain their shape immediately after forming and before they have cooled.

It is known that many linear thermoplastic polymers are characterized by relatively low melt viscosities. These include, for example, polyesters such as poly(butylene terephthalate) in addition to polycarbonates. It is also known that branched polyesters often have substantially higher melt viscosities than linear polyesters. One way of preparing branched polyesters is by the reaction of a carboxy-terminated polyester with a polyepoxy compound such as triglycidyl isocyanurate (hereinafter "TGIC"), as disclosed, for example, in copending, commonly owned applications Ser. No. 184,534, filed Apr. 21, 1988, now U.S. Pat. No. 4,904,746 and Ser. No. 322,471, filed Mar. 13, 1989 now U.S. Pat. No. 4,933,429.

Various types of branched polycarbonates are also known. These include, for example, those prepared by phosgenation of a bisphenol in the presence of a tricarboxylic acid or a functional derivative thereof such as a triacid chloride such as trimellityl chloride; this method is disclosed, for example, in U.S. Pat. No. 4,001,184. However, trimellityl chloride and similar reagents are relatively expensive and yellowing of the branched polycarbonates produced therefrom is sometimes observed. Moreover, the reaction forming branched polycarbonates is complicated by the difference in reactivity between phosgene and such reagents.

It has now been discovered that branched polycarbonates can be prepared by the reaction of certain carboxy-terminated polycarbonates with polyepoxides such as TGIC. The products have very high melt viscosities, and also have high complex viscosity ratios (as defined hereinafter), making them particularly useful, for example, in blow molding of large parts.

In one of its aspects, therefore, the invention is a method for preparing a branched polycarbonate which comprises effecting reaction between at least one linear carboxylic acid-terminated polycarbonate and an amount effective for branching of at least one polyepoxy compound. Another aspect is branched polycarbonates so prepared.

Many types of polyepoxy compounds are known in the art, and any of them are capable of use in the present invention. They include bisphenol diglycidyl ethers, epoxy novolaks, glycidyl adducts of amines and amides, glycidyl adducts of carboxylic acids, polymers of unsaturated epoxides and compounds prepared by epoxidation of dienes or polyenes. The preferred polyepoxy compounds are poly(O- or N-epoxyalkyl-substituted) cyclic amides, imides and imidates, usually containing one non-epoxy cyclic moiety although compounds with linked or fused moieties are also contemplated.

Most often, the polyepoxy compound is one in which the epoxyalkyl groups are bonded directly to the oxygen or nitrogen atoms; however, compounds containing intervening structure, such as 2-carboglycidyloxyethyl compounds, may also be used. The presence of more than one epoxy group per molecule is essential. At least three of such groups are highly preferred, with three and only three being especially preferred, by reason of the ease of preparation therefrom of branched polyesters with a minimum of crosslinking and resulting gel formation.

Illustrative cyclic nuclei which may be present are the triazine, barbiturate, hydantoin, uracil, pyromellitic diimide, piperazinedione and parabanate ring systems. As previously noted, the epoxy-containing functionalities may be present as substituents on oxygen or nitrogen atoms therein, with nitrogen atoms frequently being preferred. The most suitable compounds are triazine derivatives, including triglycidyl cyanurate and TGIC. TGIC is particularly preferred by reason of its availability and particular suitability for the formation of branched polyesters. It has the formula

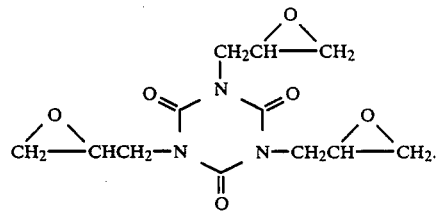

Various carboxylic-terminated polycarbonates may be employed in the invention. These include polymers made by hydrolysis of the reaction products of hydroxy-terminated polycarbonates with polycarboxylic acids and their derivatives such as trimellitic anhydride acid chloride, as disclosed in U.S. Pat. No. 4,732,934. The use of such polymers is, however, sometimes disadvantageous if more than one terminal carboxy group is present on either end of the polymer molecule, by reason of the possible formation of crosslinked products of highly complex molecular structure rather than relatively simple branched products.

Therefore, it is frequently preferred to employ polycarbonates containing at most one carboxylic acid group on each end of the polymer chain. A suitable method for preparing such polycarbonates is by initial formation of a carbo-t-alkoxy-terminated polycarbonate followed by thermal decomposition.

Carbo-t-alkoxy-terminated polycarbonates are illustrated by those having end groups of the formula

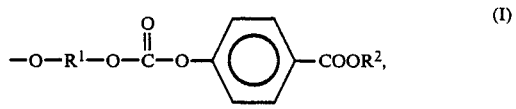 (I)

wherein $R^1$ is a divalent aliphatic, alicyclic or aromatic radical and $R^2$ is a $C_{4-6}$ tertiary alkyl radical containing at least one $\beta$-hydrogen atom. In respects other than the end groups, said polycarbonates are conventional, generally comprising structural units of the formula

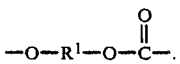
$$-O-R^1-O-\overset{O}{\underset{\|}{C}}-. \qquad (II)$$

The $R^1$ values may be different but are usually the same; those which are aliphatic or alicyclic generally contain up to about 8 carbon atoms. Suitable $R^1$ values include ethylene, propylene, trimethylene, tetramethylene, hexamethylene, dodecamethylene, poly-1,4-(2-butenylene), poly-1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is also incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the polycarbonate, and most desirably all of said $R^1$ values, are aromatic. The aromatic $R^1$ radicals preferably have the formula

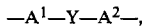
$$-A^1-Y-A^2-, \qquad (III)$$

wherein each of $A^1$ and $A^2$ is a monocyclic divalent aromatic radical and Y is a bridging radical in which one or two atoms separate $A^1$ from $A^2$. The free valence bonds in formula III are usually in the meta or para positions of $A^1$ and $A^2$ in relation to. Such $R^1$ values may be considered as being derived from bisphenols of the formula $HO-A^1-Y-A^2-OH$. Frequent reference to bisphenols will be made hereinafter, but it should be understood that $R^1$ values derived from suitable compounds other than bisphenols may be employed as appropriate.

In formula III, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o-or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, 2,2-propylene, 1,1-(2,2dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloro-ethylidene, carbonyl, oxy, thio and sulfone. For reasons of availability and particularly suitability for the purposes of this invention, the preferred radical of formula III is the 2,2-bis(4-phenylene)propane radical, which is derived from bisphenol A and in which Y is isopropylidene and $A^1$ and $A^2$ are each p-phenylene.

Carboxylic acid-terminated polycarbonates of this type may be prepared by incorporating a t-alkyl p-hydroxybenzoate of the formula

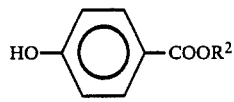

as a chainstopper in a polycarbonate-forming reaction between a carbonate source and at least one dihydroxy compound of the formula $R^1(OH)_2$, followed by thermal elimination of an olefin corresponding to the t-alkyl radical. This procedure is disclosed in U.S. Pat. No. 4,853,458, the disclosure of which is incorporated by reference herein. Any known polycarbonate-forming reaction employing dihydroxy compounds, especially bisphenols, may be employed. Typical polycarbonate-forming reactions include transesterification reactions, in which the dihydroxy compound is caused to react with a carbonate ester such as diphenyl carbonate, and interfacial reactions, in which said dihydroxy compound is caused to react with phosgene in a two-phase liquid system comprising water and an inert organic solvent. The interfacial method is frequently preferred. It is well known in the art and is generally conducted under highly alkaline conditions, most often in the presence of a catalytic amount of an amine such as triethylamine.

The proportion of chainstopper in the polycarbonate-forming reaction mixture will depend to a considerable extent on the molecular weight of the polycarbonate desired. It is generally in the range of about 1–10 mole percent, preferably about 2–8 mole percent, based on dihydroxy compound.

The preparation of such carboxy-functionalized polycarbonates is illustrated by the following examples. All molecular weights herein were determined by gel permeation chromatography relative to polystyrene.

EXAMPLE 1

A mixture of 29.1 grams (128 mmol.) of bisphenol A, 65 ml. of methylene chloride, 55 ml. of water, 2.58 ml. of triethylamine in the form of a 5% w/v solution in methylene chloride, and 869 mg. (4.48 mmol.) of t-butyl p-hydroxybenzoate was stirred at room temperature and a 50% aqueous solution of sodium hydroxide was added to bring the pH to 11. Phosgene was then passed through the mixture at 0.8 gram per minute, with maintenance of the pH at 11, to provide a 25% excess of phosgene. Additional methylene chloride was added as necessary to control the viscosity.

When the reaction was complete, the organic phase was removed and washed once with 7% aqueous hydrochloric acid solution and three times with water. The desired carbo-t-butoxy-terminated polycarbonate was precipitated into methanol, filtered and dried in vacuum. It had a weight average molecular weight of 56,000 as determined by gel permeation chromatography, and a ratio of weight average to number average molecular weight of 5.6.

A solution of 6 grams of the carbo-t-butoxy-terminated polycarbonate in 120 ml. of 1,2,3,4-tetrachlorobenzene was heated at 260° C. for 2 hours, after which the polymer was precipitated therefrom by pouring into an excess of methanol. The product was slurried in methanol, filtered and dried under vacuum. It was shown by proton nuclear magnetic resonance to contain a substantial proportion of carboxylic acid end groups, and had a weight average molecular weight of 61,600.

EXAMPLE 2

A product similar to the carbo-t-butoxy-terminated polycarbonate of Example 1, but having a weight average molecular weight of 74,700, was extruded in a vacuum vented twin-screw extruder at a screw speed of 400 rpm. and temperatures in the range of 115°–274° C. The extrudate was quenched in water, air dried, pelletized and dried in an oven at 100° C. It had a molecular weight of 62,600 and was shown by proton nuclear magnetic resonance to contain a substantial proportion of free carboxylic acid groups.

The compositions of this invention may be prepared from the above-described polyepoxy compounds and linear carboxylic acid-terminated polycarbonates by conventional blending methods. Melt blending operations are typically employed, frequently preceded by a dry blending step. A melt blending method which is often preferred is extrusion, ordinarily at temperatures in the range of about 200°–300° C. It is within the scope of the invention to melt blend the polyepoxy compound with the carbo-t-butoxy-terminated polycarbonate, and heat the resulting blend for a time sufficient to generate the carboxy-terminated polycarbonate and effect reaction thereof with the polyepoxide. Another option is to employ an extruder of sufficient length and with suitably disposed feed ports to permit initial extrusion of the t-carbalkoxy-terminated polycarbonate with conversion to the carboxy-terminated species, and subsequent addition of polyepoxide with further extrusion to produce the branched polycarbonate.

The proportion of polyepoxide employed is an amount effective to produce a branched polycarbonate of the desired melt viscosity properties, and may be readily determined by simple experimentation. For the reaction of TGIC with a carboxy-terminated polycarbonate of the type described in Example 2, it has been found that the highest melt viscosity values are usually achieved at a TGIC level of about 1% by weight, based on polycarbonate. The preferred values in this instance are generally in the range of about 0.7–1.1%.

Unlike polyesters such as poly(butylene terephthalate), carboxy-terminated polycarbonates do not generate additional carboxylic acid end groups by thermal decomposition upon heating. It is possible, however, to increase the proportion of carboxylic acid end groups by increasing the proportion of chainstopper employed for the preparation of the polycarbonate. The lower molecular weight polycarbonates thus obtained are higher in carboxylic acid end group concentration and frequently display a more pronounced increase in melt viscosity upon branching according to the present invention.

Another melt viscosity parameter which is significant in connection with the present invention is the complex viscosity value ($R^*$), which is an indication of the tendency of the polymer to thin upon shearing. Optimum performance in blow molding operations is generally demonstrated at $R^*$ values equal to or greater than 3.5, with higher $R^*$ values indicating a greater degree of cohesiveness of a large blow-molded parison.

The complex viscosity value is defined as the melt viscosity of a polymer at a shear value of one radian per second divided by 20,000. In effect, this is the ratio of the melt viscosity at low shear to that at high shear, since shear values during extrusion are about 100 radians per second and the optimum melt viscosity at such shear rates is 20,000 poise. In practice, viscosities are measured on a Rheometrics Dynamic Spectrometer at three different temperatures, typically 230°, 250° and 270° C. Using these data fitted to the Arrhenius equation, the optimum processing extrusion temperature is calculated; i.e., that temperature at which the melt viscosity is 20,000 poise at 100 radians per second. The viscosity at one radian per second at this temperature is then determined and the value of $R^*$ is calculated therefrom.

Comparisons of weight average molecular weight (Mw) and dispersivity (Mw/Mn, the ratio of weight average to number average molecular weight) with melt viscosity indicate that certain molecular weight and dispersivity values for the branched polycarbonates of this invention are highly preferred. At Mw values above about 80,000, typically produced by employing TGIC at levels above about 1.25%, melt viscosity values may become so high that the product is unprocessable in many applications; moreover, the products may become highly crosslinked and at least partially insoluble in many solvents normally used for processing. Therefore, products having Mw values in the range of about 25,000–80,000 are preferred. At dispersivity values above about 8.0, the low molecular weight fractions are a significant factor and can lead to crosslinking and excessive die swell upon extrusion; therefore, products having dispersivity values in the range of about 2.0–8.0 are also preferred.

The compositions prepared by the method of this invention are believed to have rather complex molecular structures, and therefore they are often most accurately defined in terms of the method for their preparation. However, enough is known about their molecular structure to indicate that they may also be defined as comprising molecules of the formula

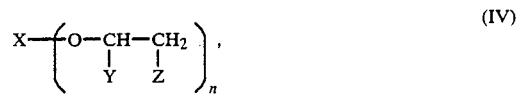

wherein X is an organic radical derived from a polyepoxy compound of the formula

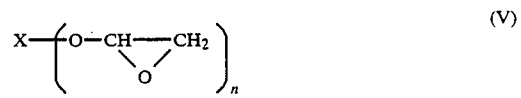

(preferably from TGIC); one of Y and Z is OH and the other is

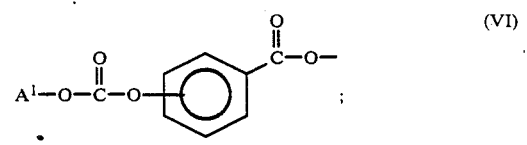

$A^1$ is a polycarbonate moiety; and n is at least 3. Compositions so defined are therefore also an aspect of the invention.

The invention is illustrated by the following examples.

EXAMPLE 3

A carboxylic acid-terminated bisphenol A polycarbonate prepared according to Examples 1-2 (i.e., employing 3.5 mole percent chainstopper) was blended with various proportions of TGIC by dry mixing followed by tumble mixing on a roll mill for 30 minutes. The mixtures were extruded on a counterrotating twin-screw extruder at temperatures in the range of 135°-275° C. and a screw speed of 400 rpm. The extrudates were quenched in water, pelletized and dried in an oven at 100° C.

EXAMPLE 4

The procedure of Example 3 was repeated, employing a carboxy-terminated polycarbonate prepared using 6 mole percent chainstopper.

Melt viscosity values of the branched polycarbonates prepared in Examples 3-4 were determined by the Tinius-Olsen method. The results are given in the following table.

| | Example 3 | | | Example 4 | | |
|---|---|---|---|---|---|---|
| TGIC, % | Mw | Mw/Mn | Melt visc., poise | Mw | Mw/Mn | Melt visc., poise |
| 0 | 52,200 | 4.8 | 33,700 | 47,900 | 7.0 | 27,900 |
| 0.25 | 50,600 | 4.3 | 60,500 | 48,300 | 7.1 | 29,700 |
| 0.50 | 62,100 | 4.3 | 95,900 | 53,700 | 7.1 | 45,100 |
| 0.75 | 60,700 | 4.4 | 132,400 | 57,300 | 7.7 | 81,500 |
| 1.00 | 65,000 | 4.6 | 171,500 | 62,000 | 7.3 | 165,100 |
| 1.25 | 46,200 | 3.9 | 54,800 | 108,400 | 9.1 | >5,000,000 |
| 1.50 | 62,000 | 3.6 | 57,000 | — | — | — |
| 2.00 | 65,300 | 3.9 | 46,500 | — | — | — |

It is apparent from these results that the products of Example 3, prepared using a relatively low proportion of chainstopper, reach a peak melt viscosity at a TGIC level of about 1%. On the other hand, the initially lower molecular weight products of Example 4 increase progressively in melt viscosity and also in molecular weight, with the viscosity increase being so precipitous above 1% that that value also represents the preferred level in this instance.

Complex viscosity (R*) values were also determined for the branched polycarbonates prepared using 1% TGIC. They were found to be 3.9 for the product of Example 3 and 9.5 for the product of Example 4.

What is claimed is:

1. A method for preparing a branched polycarbonate which comprises effecting reaction between at least one linear carboxylic acid-terminated polycarbonate and an amount effective for branching of at least one polyepoxy compound.

2. A method according to claim 1 wherein the polyepoxy compound is a poly(0- or N-epoxyalkyl-substituted) cyclic amide, imide or imidate.

3. A method according to claim 2 wherein the polycarbonate contains at most one carboxylic acid group on each end of the polymer chain.

4. A method according to claim 3 wherein the polycarbonate has end groups of the formula

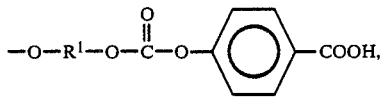

wherein $R^1$ is a divalent aliphatic, alicyclic or aromatic radical.

5. A method according to claim 4 wherein $R^1$ is an aromatic radical.

6. A method according to claim 5 wherein the polyepoxy compound is triglycidyl isocyanurate.

7. A method according to claim 6 wherein the proportion of triglycidyl isocyanurate employed is about 0.7-1.1% based on polycarbonate.

8. A method according to claim 7 wherein the polycarbonate is a bisphenol A polycarbonate.

9. A branched polycarbonate prepared by the method of claim 1.

10. A branched polycarbonate prepared by the method of claim 3.

11. A branched polycarbonate prepared by the method of claim 4.

12. A branched polycarbonate prepared by the method of claim 5.

13. A branched polycarbonate prepared by the method of claim 6.

14. A branched polycarbonate according to claim 13 which has a weight average molecular weight in the range of about 25,000-80,000 and a dispersivity in the range of about 2.0-8.0.

15. A branched polycarbonate prepared by the method of claim 8.

16. A branched polycarbonate comprising molecules of the formula

 (IV)

wherein X is an organic radical derived from a polyepoxy compound of the formula

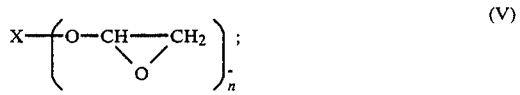 (V)

one of Y and Z is OH and the other is

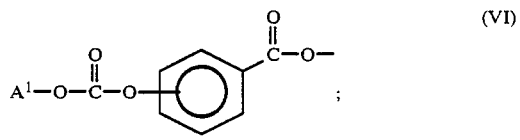 (VI)

$A^1$ is a polycarbonate moiety; and n is at least 3.

17. A branched polycarbonate according to claim 16 wherein the polyepoxy compound contains a single triazine, barbiturate, hydantoin, uracil, pyromellitic diimide, piperazinedione or parabanate moiety and the epoxyalkyl groups therein are bonded directly to oxygen or nitrogen atoms.

18. A branched polycarbonate according to claim 17 wherein the polyepoxide is triglycidyl isocyanurate.

19. A branched polycarbonate according to claim 18 which has a weight average molecular weight in the range of about 25,000-80,000 and a dispersivity in the range of about 2.0-8.0.

20. A branched polycarbonate according to claim 19 which is a bisphenol A polycarbonate.

* * * * *